UNITED STATES PATENT OFFICE.

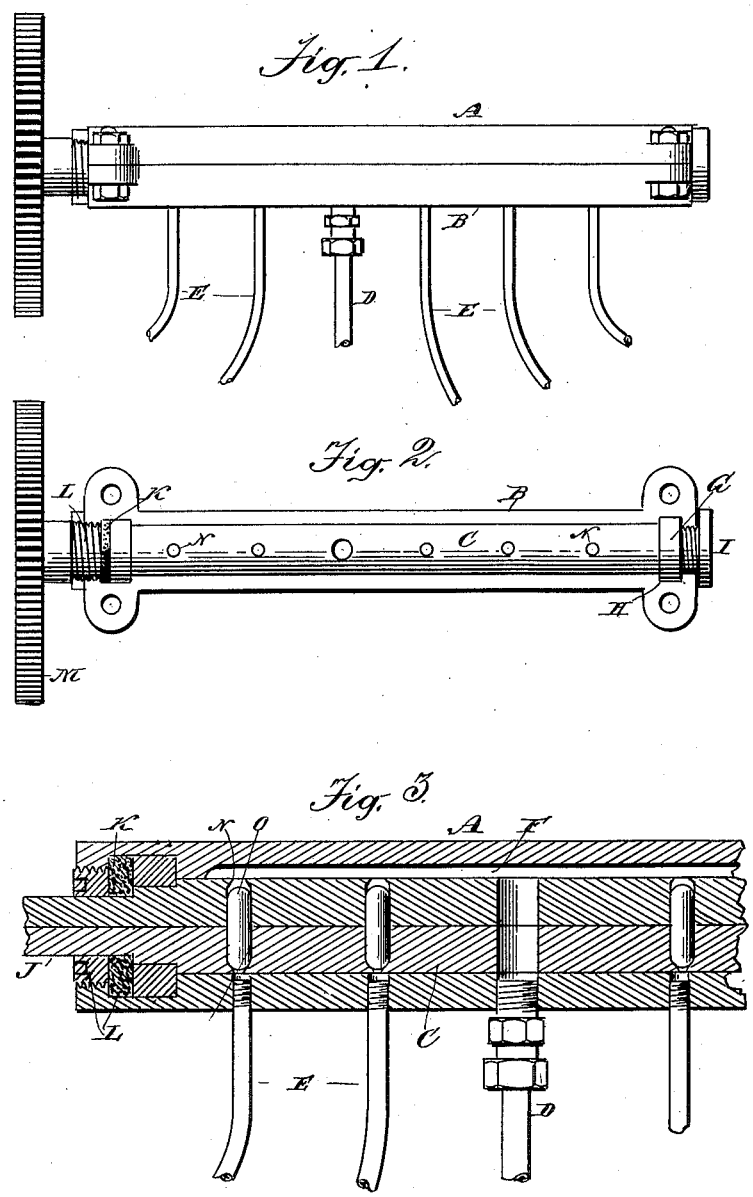

JESSE BERRY, OF BERTRAM, IOWA.

OILING DEVICE.

1,092,329.	Specification of Letters Patent.	Patented Apr. 7, 1914.

Application filed April 14, 1913. Serial No. 761,106.

*To all whom it may concern:*

Be it known that I, JESSE BERRY, a citizen of the United States, residing at Bertram, in the county of Linn and State of Iowa, have invented certain new and useful Improvements in Oiling Devices, of which the following is a specification.

This invention relates to the oiling of machinery, and the object of the invention is to provide means for forcibly and positively distributing oil to various bearings from a single source of supply.

The nature of the invention is fully disclosed in the description and claims following, reference being had to the accompanying drawings, in which:—

Figure 1 is a side view of an oiling device embodying my invention. Fig. 2 is a plan view of the same, with the cap removed. Fig. 3 is a fragmentary mid-section in the plane of Fig. 1.

In the drawing, A and B represent the top and bottom halves, respectively, of a bearing or box for a cylinder C fitting very nicely therein. Communicating with the box is an oil supply pipe D, which is supposed to connect with a small oil-pump, not shown, so that oil is delivered to the interior of the box under moderate pressure. The box is also supplied with a series of distributing pipes E, which are supposed to connect with various bearings in a machine, or in separated machines, not shown. In the drawing all the pipes are shown connecting with the bottom half of the box, though the particular manner of attachment is not regarded as specially important. One of the parts of the box should, however, be provided with a longitudinal distributing groove F, to carry the oil to the various outlet pipes. The joining of the halves of the box should be practically oil-tight, as should also the ends, to prevent leakage. At one end this may be done without packing, by providing the cylinder with a collar G, the box having a corresponding groove H, and a thrust-screw I by means of which the flange is held in close contact with the inner side of the groove, as clearly shown in Fig. 2. A similar construction is shown at the other end, in addition to which the outgoing stem J of the cylinder is packed at K, as with felt, compressed by a gland-nut L. To this stem is attached a gear M, or the like, by which the cylinder is revolved by driving mechanism, not shown. The oil admitted to the interior of the box is discharged intermittently, in small portions, like drops, as will now be explained.

Referring to Fig. 3 it will be seen that the cylinder is made in halves. This is to allow for the boring from the inner side, of holes N in said cylinder, which are smallest at the periphery of the cylinder. In these holes are placed nicely fitting plungers O, a little shorter than the diameter of the cylinder, and with ends formed to close said holes, like puppet valves, from the inner side.

The action of the device will be readily understood by referring to Fig. 3. Oil enters the box through the inlet pipe, under some pressure, as above mentioned, and fills the longitudinal groove and the outlet receptacles when in communication therewith. A half revolution of the cylinder reverses the position of the plungers, and the drops of oil so caught are forced out at the under side into the communicating pipes, and thence, when the pipes are filled, to the distant bearings.

Having thus described my invention, I claim:

1. An oiling device, comprising a rotary cylinder having transverse holes therein reduced in diameter at the periphery of the cylinder, plungers a little shorter than said holes mounted therein, and adapted to alternately close said holes at either end, an inclosing box or bearing for said cylinder, provided with an inlet pipe and a series of outlet pipes, means for delivering oil through the inlet pipe under pressure, and means for revolving the cylinder.

2. In combination with an inclosing box or bearing, and inlet and outlet pipes communicating therewith, an oil feeding device, comprising a rotary cylinder formed in longitudinal halves and provided with holes constricted at the periphery, and plungers adapted to play a little endwise in said holes, and to close opposite ends alternately.

3. In an oiling device, the combination of a rotary cylinder having holes and plungers, substantially as described, and collars near its ends, of an inclosing box or bearing, provided with suitable inlet and outlet pipes, and grooved to receive said collars, an adjusting screw at one end of the cylinder, and a packing and gland at the stem end, substantially as and for the purpose set forth.

In testimony whereof I affix my signature in presence of two witnesses.

JESSE BERRY.

Witnesses:
J. M. ST. JOHN,
E. J. YOUNG.